United States Patent
Toy

(10) Patent No.: US 11,863,404 B1
(45) Date of Patent: Jan. 2, 2024

(54) SYSTEMS AND METHODS FOR CALCULATING OPTIMUM CUSTOMER ACCESS PATHS FOR APPLICATIONS PROVIDED BY MULTI-CLOUD PROVIDERS THROUGH PRIVATE NETWORKS

(71) Applicant: Verizon Patent and Licensing Inc., Basking Ridge, NJ (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/821,656

(22) Filed: Aug. 23, 2022

(51) Int. Cl.
*H04L 41/5019* (2022.01)
*H04L 43/0829* (2022.01)
*H04L 43/087* (2022.01)

(52) U.S. Cl.
CPC ........ *H04L 41/5019* (2013.01); *H04L 43/087* (2013.01); *H04L 43/0829* (2013.01)

(58) Field of Classification Search
None
See application file for complete search history.

(56) References Cited

U.S. PATENT DOCUMENTS

| | | | |
|---|---|---|---|
| 2002/0166117 A1* | 11/2002 | Abrams | H04L 43/00 717/177 |
| 2011/0282982 A1* | 11/2011 | Jain | G06F 9/5094 709/223 |
| 2015/0032894 A1* | 1/2015 | Rosensweig | G06F 9/5088 709/226 |
| 2015/0134823 A1* | 5/2015 | Cucinotta | H04L 47/2425 709/226 |
| 2015/0156082 A1* | 6/2015 | Kakadia | H04L 47/2458 709/223 |
| 2019/0036816 A1* | 1/2019 | Evans | H04L 41/342 |
| 2019/0334770 A1* | 10/2019 | Xiang | H04L 41/0896 |
| 2022/0124005 A1* | 4/2022 | Doshi | G06F 1/3228 |
| 2023/0028646 A1* | 1/2023 | Nainar | H04L 63/029 |

* cited by examiner

*Primary Examiner* — Mohamed A. Wasel
*Assistant Examiner* — James Ross Hollister

(57) ABSTRACT

A device may receive a request for an application from a user device, network data for a network provider and a cloud provider associated with the user device, and SLA constraints. The device may calculate a plurality of cost vectors associated with defining a path for the user device to access the application, and may identify a network provider device that provides a first least cost path and satisfies a first threshold. The device may identify, from a plurality of cloud provider devices, a set of cloud provider devices that support the application for the network provider device, and may identify a cloud provider device that provides a second least cost path and satisfies a second threshold. The device may cause the application to be provided from the cloud provider device to the user device, via the network provider device.

20 Claims, 12 Drawing Sheets

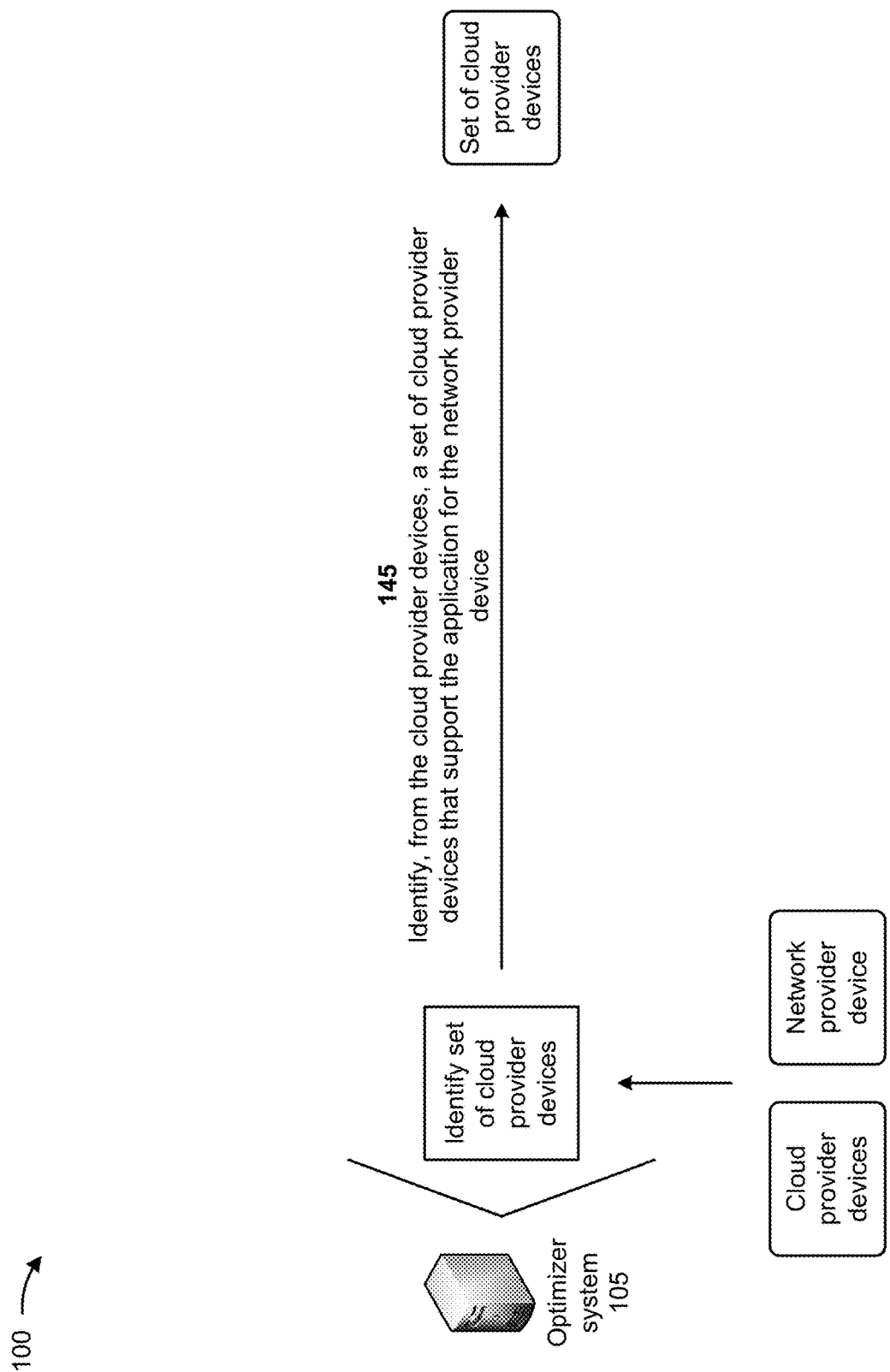

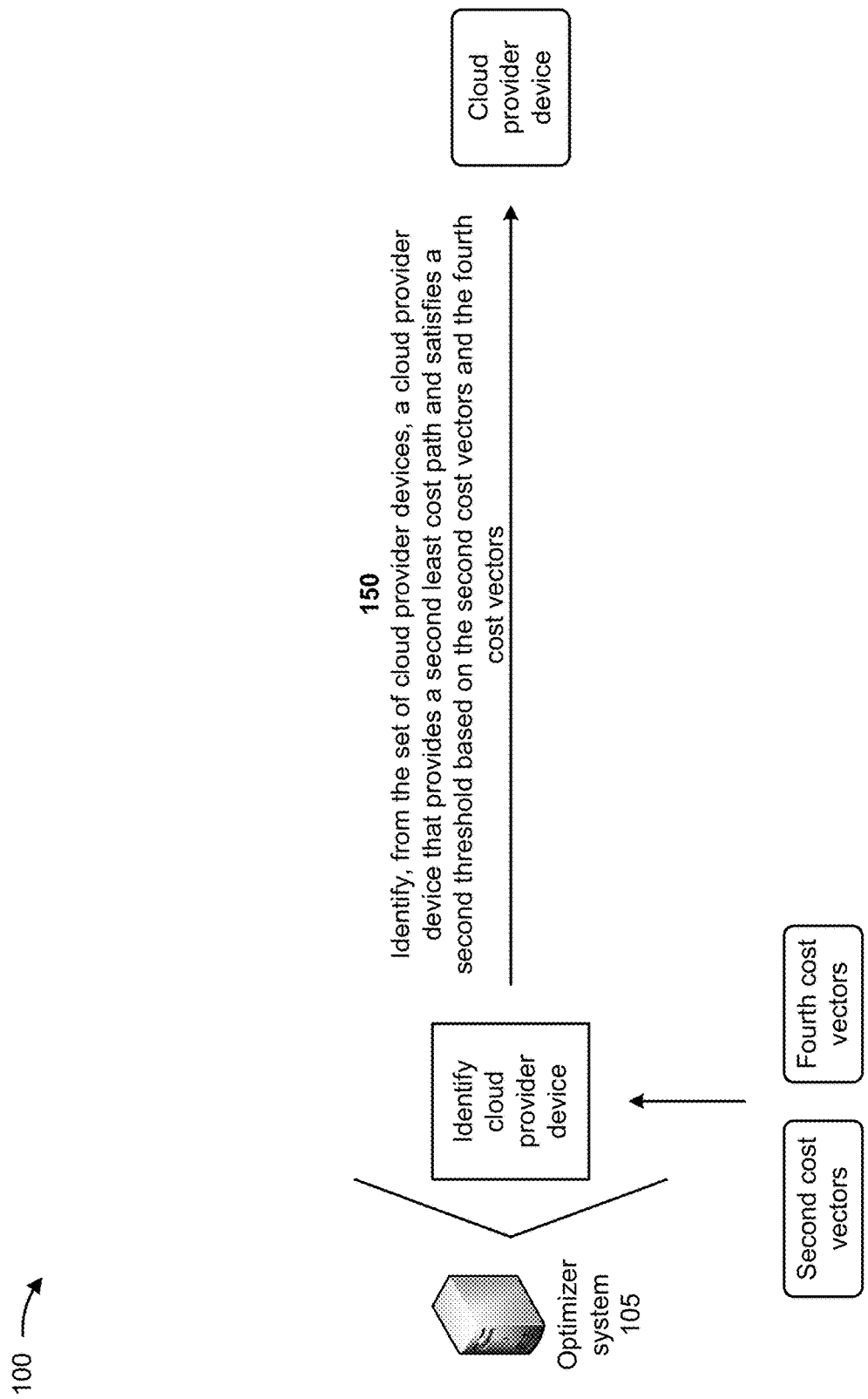

SYSTEMS AND METHODS FOR CALCULATING OPTIMUM CUSTOMER ACCESS PATHS FOR APPLICATIONS PROVIDED BY MULTI-CLOUD PROVIDERS THROUGH PRIVATE NETWORKS

BACKGROUND

Customer access paths for applications provided by multi-cloud providers through private networks requires significant optimization to ensure proper customer experiences.

BRIEF DESCRIPTION OF THE DRAWINGS

FIGS. 1A-1I are diagrams of an example associated with calculating optimum customer access paths for applications provided by multi-cloud providers through private networks.

DETAILED DESCRIPTION OF EXAMPLE EMBODIMENTS

Figure 1A:
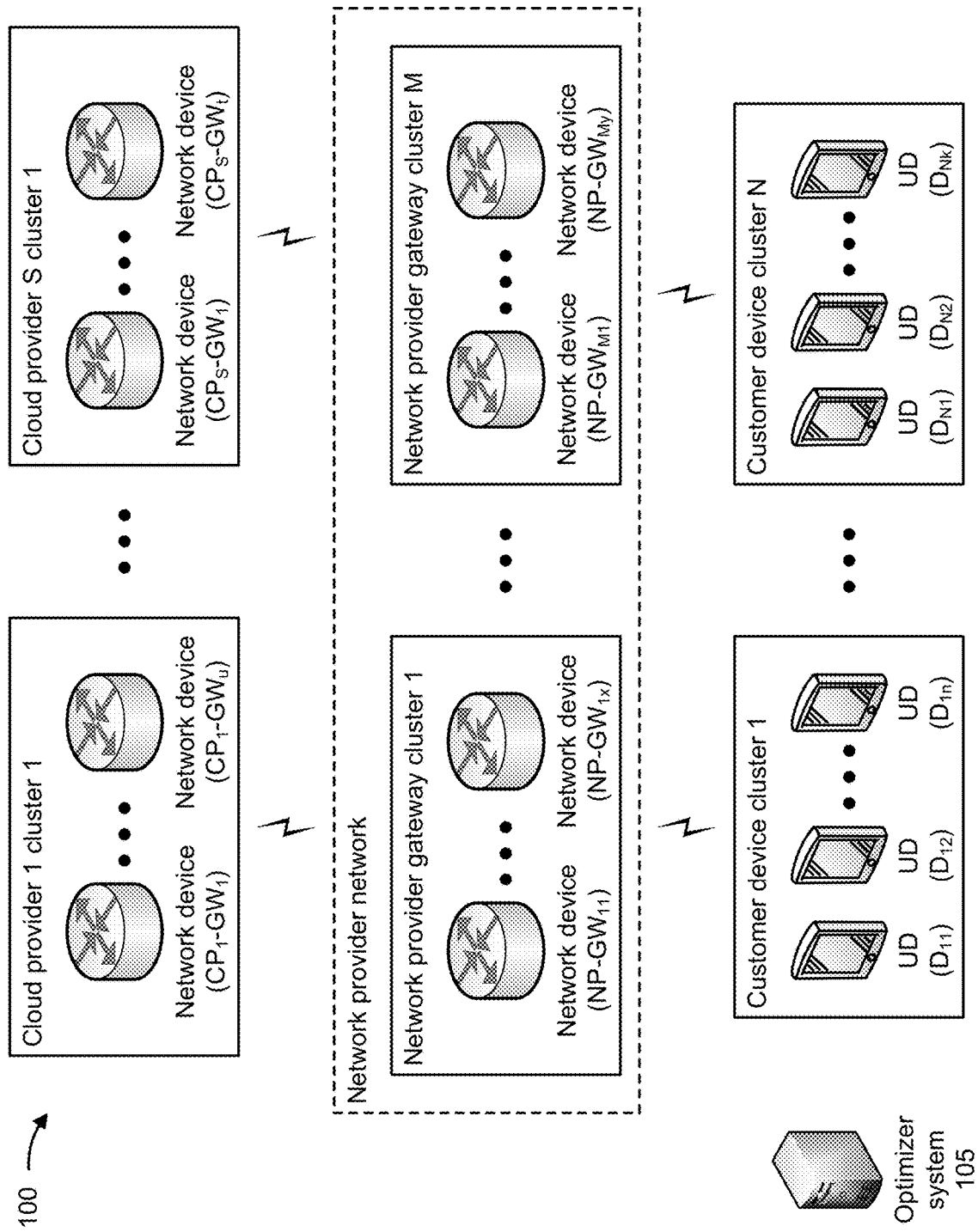

The following detailed description of example implementations refers to the accompanying drawings. The same reference numbers in different drawings may identify the same or similar elements.

Customers deploy applications with components that reside on multiple cloud providers. Therefore, access to such applications by the customers must be optimized. Optimization of customer access to applications provided by multi-cloud providers through private networks requires optimization of paths from customer locations (e.g., user devices) to private network provider devices (e.g., gateways) to cloud providers (e.g., multiple cloud computing environments). Optimization of customer access paths for applications provided by multi-cloud providers through private networks also requires optimization of a path from the private network provider gateways to cloud provider devices (e.g., gateways) and applications (e.g., or application platforms). Such optimizations require consideration of customer service level agreements (SLAs) and utilizations of the private network devices and the cloud provider devices. However, current techniques for providing customer access to applications provided by multi-cloud providers through private networks fail to consider such optimizations and considerations. Thus, current techniques for providing customer path optimization consume computing resources (e.g., processing resources, memory resources, communication resources, and/or the like), networking resources, and/or other resources associated with handling poor customer experiences associated with accessing the applications, inefficiently utilizing network provider devices, inefficiently utilizing cloud provider devices, handling lost traffic associated with accessing the applications, and/or the like.

Some implementations described herein provide an optimizer system that calculates optimum customer access paths for applications provided by multi-cloud providers through private networks. For example, the optimizer system may receive a request for an application from a user device, and may receive network data for a network provider and a cloud provider associated with the user device and SLA constraints associated with the user device, the network provider, and the cloud provider. The optimizer system may calculate, based on the network data and the SLA constraints, a plurality of cost vectors associated with defining a path for the user device to access the application, and may identify, from a plurality of network provider devices, a network provider device that provides a first least cost path and satisfies a first threshold based on the plurality of cost vectors. The optimizer system may identify, from a plurality of cloud provider devices, a set of cloud provider devices that support the application for the network provider device, and may identify, from the set of cloud provider devices, a cloud provider device that provides a second least cost path and satisfies a second threshold based on the plurality of cost vectors. The optimizer system may cause the application to be provided from the cloud provider device to the user device, via the network provider device.

In this way, the optimizer system calculates optimum customer access paths for applications provided by multi-cloud providers through private networks. For example, the optimizer system may identify, for a user device (e.g., a customer device) attempting to access an application, an optimum network provider device (e.g., gateway) that provides a least cost access path (e.g., that provides minimum delay, jitter, loss, and/or the like) and resource (e.g., processor, memory, bandwidth, and/or the like) utilizations below a threshold level. The optimization system may identify cloud provider devices (e.g., gateways) that support the application, and may identify, for the optimum network provider device and from the cloud provider devices that support the application, an optimum cloud provider device that provides a least cost access path (e.g., minimum usage charge, delay, jitter, loss, and/or the like) and resource utilizations below a threshold level. Thus, the optimizer system may conserve computing resources, networking resources, and/or other resources that would have otherwise been consumed by handling poor customer experiences associated with accessing the applications, inefficiently utilizing network provider devices, inefficiently utilizing cloud provider devices, handling lost traffic associated with accessing the applications, and/or the like.

FIGS. 1A-1I are diagrams of an example 100 associated with calculating optimum customer access paths for applications provided by multi-cloud providers through private networks. As shown in FIGS. 1A-1I, example 100 includes an optimizer system 105 associated with one or more user devices (UDs) of customer device clusters (e.g., customer device cluster 1 through customer device cluster N), one or more network devices of a network provider (NP) network that includes network provider gateway clusters (e.g., network provider gateway cluster 1 through network provider gateway cluster M), and one or more network devices of cloud provider (CP) clusters (e.g., cloud provider 1 cluster 1 through cloud provider S cluster 1). Further details of the optimizer system 105, the user devices, the network devices, the network provider network, and the clusters are provided elsewhere herein.

As shown in FIG. 1A, a first customer device cluster (e.g., customer device cluster 1) may include multiple user devices (e.g., $D_{11}$ through $D_{1n}$), an Nth customer device cluster (e.g., customer device cluster N) may include multiple user devices (e.g., $D_{N1}$ through $D_{Nk}$), and/or the like. A first network provider gateway cluster (e.g., network provider gateway cluster 1) may include multiple network devices (e.g., NP-$GW_{11}$ through NP-$GW_{1x}$), an Mth network provider gateway cluster (e.g., network provider gateway cluster M) may include multiple network devices (e.g., NP-GW$_{M1}$ through NP-GW$_{My}$), and/or the like. A first cloud provider cluster (e.g., cloud provider 1 cluster 1) may include multiple network devices (e.g., CP$_1$-GW$_1$ through CP$_1$-GW$_u$), another cloud provider cluster (e.g., cloud provider S cluster 1) may include multiple network devices (e.g., CPs-GW$_1$ through CPs-GW$_t$), and/or the like.

The optimizer system 105 may calculate optimum paths for the user devices to access applications provided by the cloud provider clusters, via the network provider gateway clusters. In some implementations, when calculating the optimum paths for the user devices to access the applications, the optimizer system 105 may assume that certain user devices (e.g., a customer region or a market region) access pre-identified primary and secondary network provider devices or a pre-identified network provider gateway cluster, and may assume that certain network provider gateway clusters access pre-identified primary and secondary cloud provider devices of each cloud provider cluster or a pre-identified cloud provider cluster of each cloud provider (i.e., a cloud provider cluster may include a set of cloud provider devices in multiple regions of a cloud provider). Optimum access to the cloud providers may depend on a least cost (e.g., a least usage-based charge, a least delay, a least loss, a least jitter, and/or the like) path from a network provider device to a cloud provider device, an availability of the application at a least cost cloud provider device, resource availability (e.g., processor, memory, port bandwidth, and/or the like) at the least cost cloud provider device, and/or the like.

In some implementations, when calculating an optimum path for a user devices to access an application, the optimizer system 105 may identify a best network provider device for the user device based on a network provider least cost access path (e.g., minimum delay, jitter, loss, and/or the like) and network provider resource (e.g., processor, memory, port bandwidth, and/or the like) utilizations below a threshold level, and may identify cloud provider clusters (e.g., locations) supporting the requested application. The optimizer system 105 may identify a cloud provider device for the best network provider device based on a cloud provider least cost access path (e.g., minimum delay, jitter, loss, and/or the like) and cloud provider resource (e.g., processor, memory, port bandwidth, and/or the like) utilizations below a threshold level.

Figure 1B:
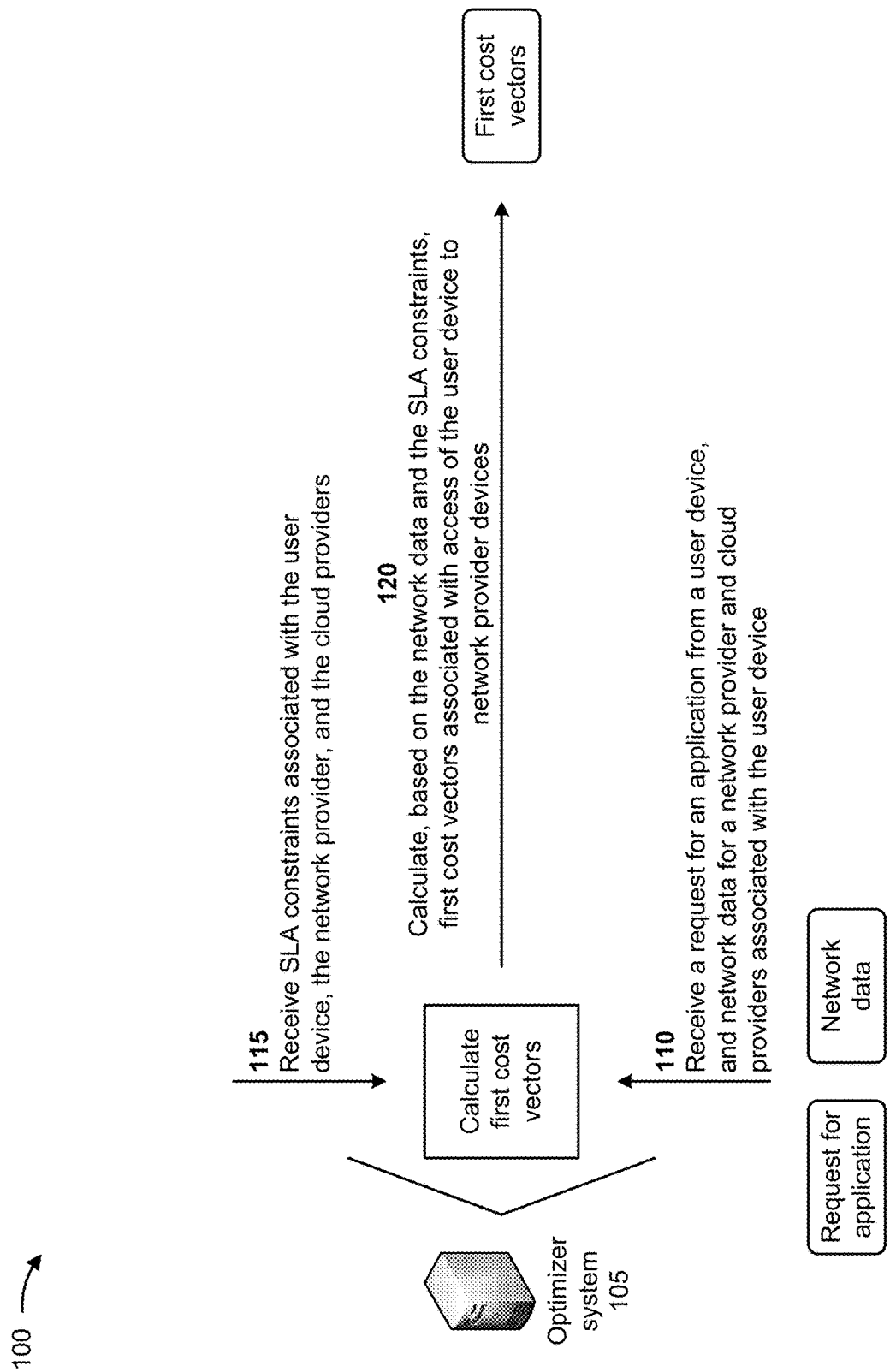

As shown in FIG. 1B, and by reference number 110, the optimizer system 105 may receive a request for an application from a user device, and network data for a network provider and cloud providers associated with the user device. For example, a user of the user device (e.g., D$_{12}$) may wish to access the application from one of the cloud provider clusters, and may cause the user device to generate the request for the application. The user may cause the user device to provide the request for the application to the optimizer system 105, and the optimizer system 105 may receive the request for the application from the user device. The optimizer system 105 may continuously receive the network data from the network provider gateway clusters of the network provider network and/or from the cloud provider clusters, may periodically receive the network data from the network provider gateway clusters of the network provider network and/or from the cloud provider clusters, may receive the network data based on a request provided to the network provider gateway clusters of the network provider network and/or from the cloud provider clusters, and/or the like.

In some implementations, the network data may include data identifying delays associated with access of the user device to a plurality of network provider devices (e.g., the network devices) of the network provider network, losses associated with access of the user device to the plurality of network provider devices, jitter associated with access of the user device to the plurality of network provider devices, memory utilizations associated with the plurality of network provider devices and a plurality of cloud provider devices (e.g., the network devices) of the cloud provider clusters, processor utilizations associated with the plurality of network provider devices and the plurality of cloud provider devices, bandwidth utilizations associated with the plurality of network provider devices and the plurality of cloud provider devices, delays associated with access of the plurality of network provider devices to the plurality of cloud provider devices, losses associated with access of the plurality of network provider devices to the plurality of cloud provider devices, jitter associated with access of the plurality of network provider devices to the plurality of cloud provider devices, usage charges associated with access of the plurality of network provider devices to the plurality of cloud provider devices, and/or the like.

As further shown in FIG. 1B, and by reference number 115, the optimizer system 105 may receive SLA constraints associated with the user device, the network provider, and the cloud providers. For example, the optimizer system 105 may receive the SLA constraints from the user device, the network provider network, the cloud provider clusters, and/or the like. In some implementations, the optimizer system 105 may receive the SLA constraints associated with the user device from the request for the application received from the user device. In some implementations, the optimizer system 105 may receive the SLA constraints associated with the network provider based on requesting the SLA constraints from the network provider network. In some implementations, the optimizer system 105 may receive the SLA constraints associated with the cloud providers based on requesting the SLA constraints from the cloud provider clusters.

The SLA constraints may include constraints associated with usage charges, round trip delays (or one-way delays) for access of the user device to the cloud provider devices (e.g., the network devices) of the cloud provider clusters, one-way losses for access of the user device to the cloud provider devices, one-way jitter for access of the user device to the cloud provider devices, memory utilizations for the network provider devices (e.g., the network devices) of the network provider network and the cloud provider devices, processor utilizations for the network provider devices and the cloud provider devices, bandwidth utilizations for the network provider devices and the cloud provider devices, and/or the like.

In some implementations, the usage charges ($U_{CNPGW\text{-}CPGW}$) may be less than a threshold usage charge ($UC_{D\text{-}SLA}$); the round trip delays ($RTD_{D\text{-}CPGW}$) may be less than a threshold round trip delay ($RTD_{D\text{-}SLA}$), where the round trip delay is for access of the user device to a remote cloud provider device; the one-way losses ($L_{D\text{-}CPGW}$) for access of the user device to the cloud provider devices may be less than a threshold one-way loss ($L_{D\text{-}SLA}$), where the one-way losses are maximum losses of both directions for access of the user device to a remote cloud provider device; the one-way jitter ($J_{D\text{-}CPGW}$) for access of the user device to the cloud provider devices may be less that a threshold jitter ($J_{D\text{-}SLA}$), where the one-way jitter are maximum jitters of both directions for access of the user device to a remote cloud provider device; the memory utilizations for the network provider devices ($CPGW_{mem-util}$) may be less than a threshold memory utilization ($\alpha$); the processor utilizations for the network provider devices ($NPGW_{cpu-util}$) may be less than a threshold processor utilization ($\beta$); the bandwidth utilizations for the network provider devices ($NPGW_{port-util}$) may be less than a threshold port bandwidth utilization ($\gamma$); the memory utilizations for the cloud provider devices ($CPGW_{mem-util}$) may be less than a threshold memory utilization ($\alpha$); the processor utilizations for the cloud provider devices ($CPGW_{cpu-util}$) may be less than a threshold processor utilization ($\beta$); and the bandwidth utilizations for the cloud provider devices ($CPGW_{port-util}$) may be less than a threshold port bandwidth utilization ($\gamma$).

In some implementations, the thresholds for the memory utilizations of the network provider devices ($NPGW_{mem-util}$) and the memory utilizations of the cloud provider devices ($CPGW_{mem-util}$) may be $\alpha_1$ and $\alpha_2$, respectively, but the same threshold ($\alpha$) may be utilized for both memory utilizations. In some implementations, the thresholds for the processor utilizations of the network provider devices ($NPGW_{cpu-util}$) and the memory utilizations of the cloud provider devices ($CPGW_{cpu-util}$) may be $\beta_1$ and $\beta_2$, respectively, but the same threshold ($\beta$) may be utilized for both processor utilizations. In some implementations, the thresholds for the bandwidth utilizations of the network provider devices ($NPGW_{port-util}$) and the memory utilizations of the cloud provider devices ($CPGW_{port-util}$) may be $\gamma_1$ and $\gamma_2$, respectively, but the same threshold ($\gamma$) may be utilized for both bandwidth utilizations.

As further shown in FIG. 1B, and by reference number 120, the optimizer system 105 may calculate, based on the network data and the SLA constraints, first cost vectors associated with access of the user device to network provider devices. For example, when calculating the first cost vectors associated with access of the user device to the network provider devices, the optimizer system 105 may utilize the network data and the SLA constraints to calculate delays, losses, and jitter associated with access of the user device to the network provider devices, and to generate the first cost vectors based on the delays, the losses, and the jitter. In some implementations, costs associated with the user device access to network provider devices may be provided by $C_{D-NPGW}$, costs for delays associated with access of the user device to the network provider devices may be provided by $NPGW_D$, costs for losses associated with access of the user device to the network provider devices may be provided by $NPGW_L$, and costs for jitter associated with access of the user device to the network provider devices may be provided by $NPGW_J$. In such implementations, the first cost vectors may be provided by the following:

$$C_{D-NPGW} = \begin{bmatrix} NPGW_D \\ NPGW_L \\ NPGW_J \end{bmatrix}.$$

Figure 1C:
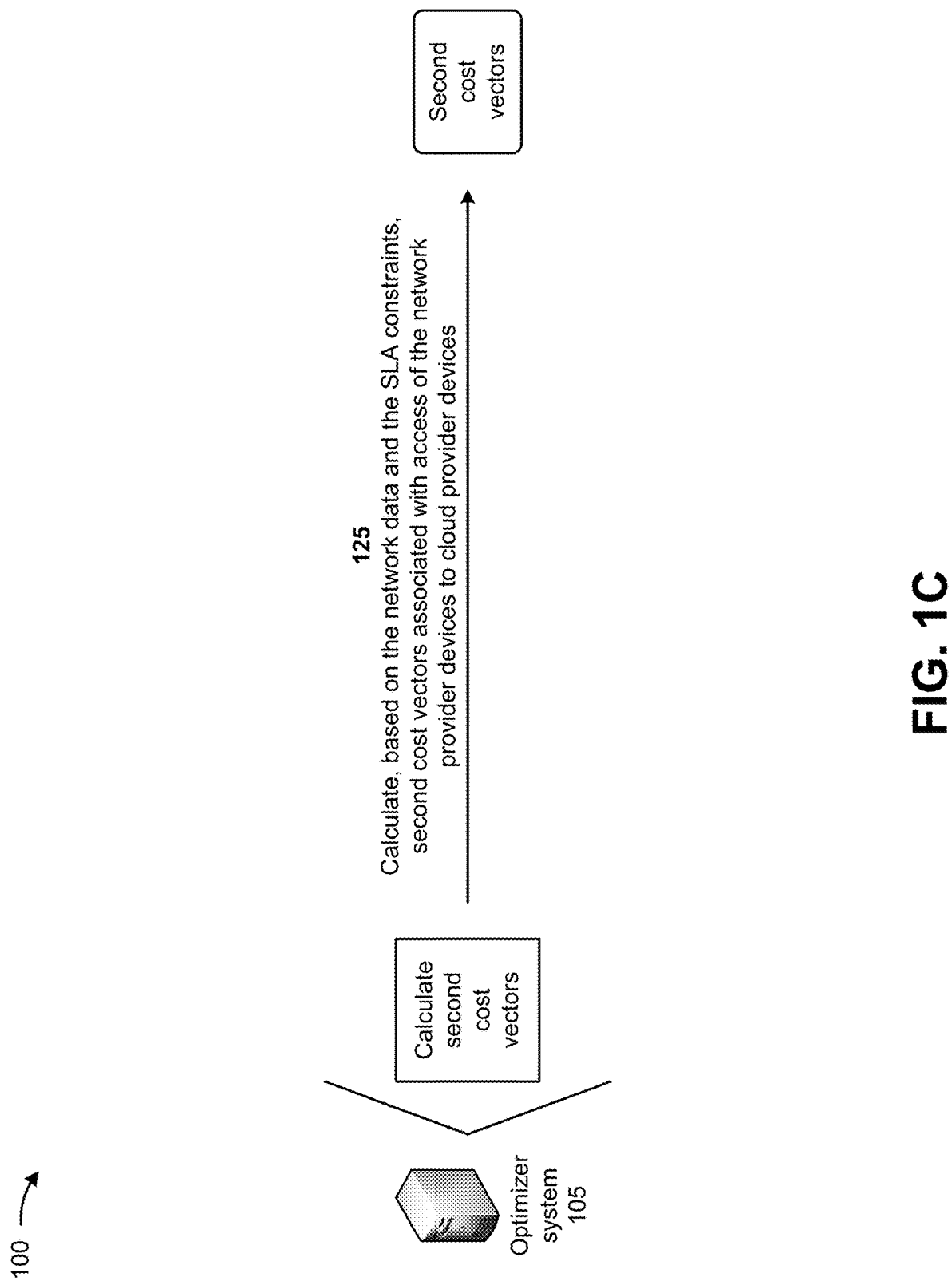

As shown in FIG. 1C, and by reference number 125, the optimizer system 105 may calculate, based on the network data and the SLA constraints, second cost vectors associated with access of the network provider devices to cloud provider devices. For example, when calculating the second cost vectors associated with access of the network provider devices to the cloud provider devices, the optimizer system 105 may utilize the network data and the SLA constraints to calculate delays, losses, jitter, and usage charges associated with access of the network provider devices to the cloud provider devices, and to generate the second cost vectors based on the delays, the losses, the jitter, and the usage charges. In some implementations, costs associated with the network provider devices access to the cloud provider devices may be provided by $C_{NPGW-CPGW}$, costs for delays associated with access of the network provider devices to the cloud provider devices may be provided by $CPGW_D$, costs for losses associated with access of the network provider devices to the cloud provider devices may be provided by $CPGW_L$, costs for jitter associated with access of the network provider devices to the cloud provider devices may be provided by $CPGW_J$, and costs for usage charges associated with access of the network provider devices to the cloud provider devices may be provided by $CPGW_{UC}$. In such implementations, the second cost vectors may be provided by the following:

$$C_{NPGW-CPGW} = \begin{bmatrix} CPGW_D \\ CPGW_L \\ CPGW_J \\ CPGW_{UC} \end{bmatrix}.$$

Figure 1D:
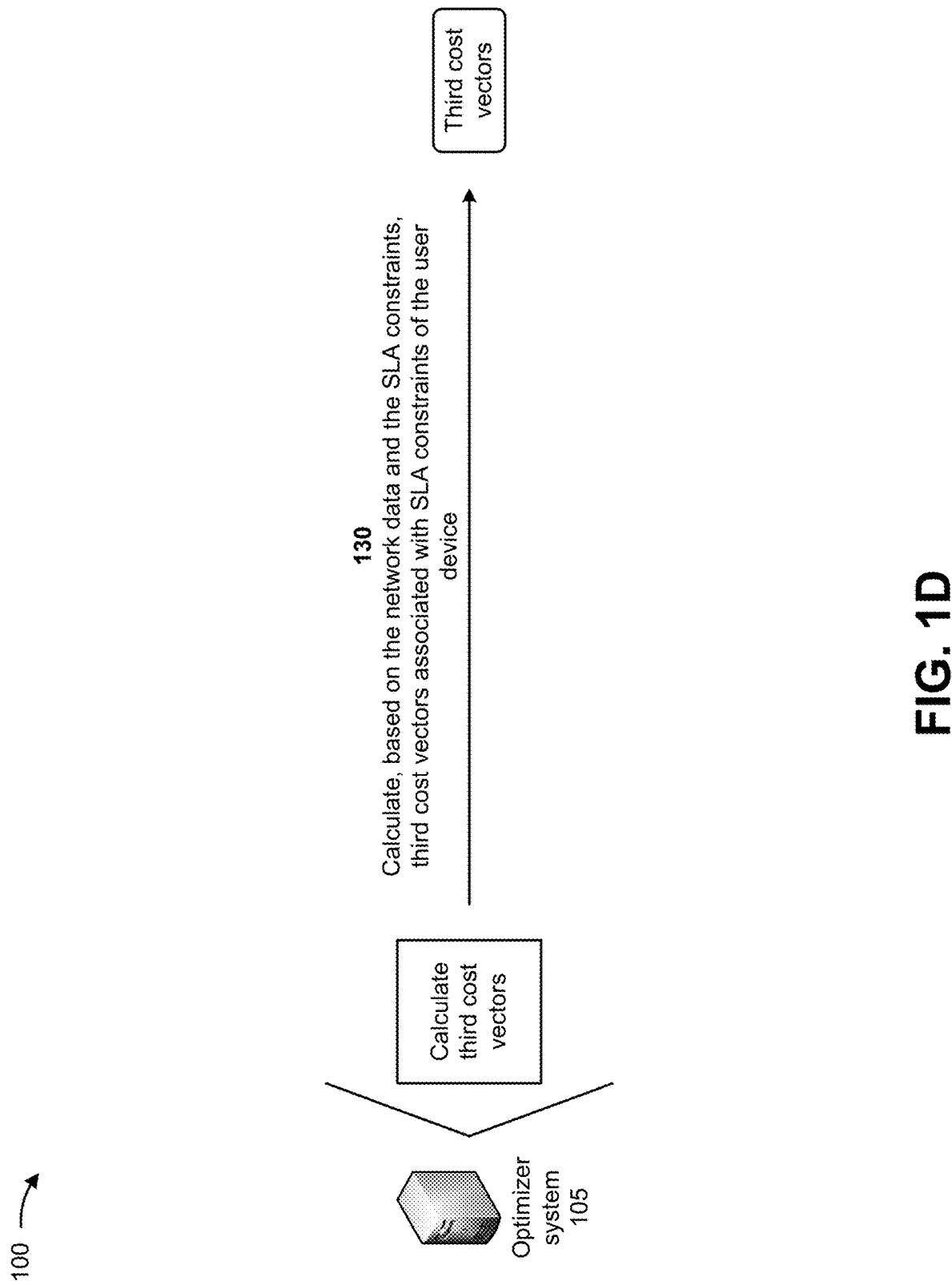

As shown in FIG. 1D, and by reference number 130, the optimizer system 105 may calculate, based on the network data and the SLA constraints, third cost vectors associated with SLA constraints of the user device. For example, when calculating the third cost vectors associated with the SLA constraints of the user device, the optimizer system 105 may utilize the network data and the SLA constraints to calculate delays, losses, jitter, and usage charges associated with the SLA constraints of the user device, and to generate the third cost vectors based on the delays, the losses, the jitter, and the usage charges. In some implementations, costs associated with the SLA constraints of the user device may be provided by $C_{D-SLA}$, costs for delays (e.g., round trip delays (RTDs) associated with the SLA constraints of the user device may be provided by $RTD_{D-SLA}$, costs for losses associated with the SLA constraints of the user device may be provided by $L_{D-SLA}$, costs for jitter associated with the SLA constraints of the user device may be provided by $J_{D-SLA}$, and costs for usage charges associated with the SLA constraints of the user device may be provided by $UC_{D-SLA}$. In such implementations, the third cost vectors may be provided by the following:

$$C_{D-SLA} = \begin{bmatrix} RTD_{D-SLA} \\ L_{D-SLA} \\ J_{D-SLA} \\ UC_{D-SLA} \end{bmatrix}.$$

Figure 1E:
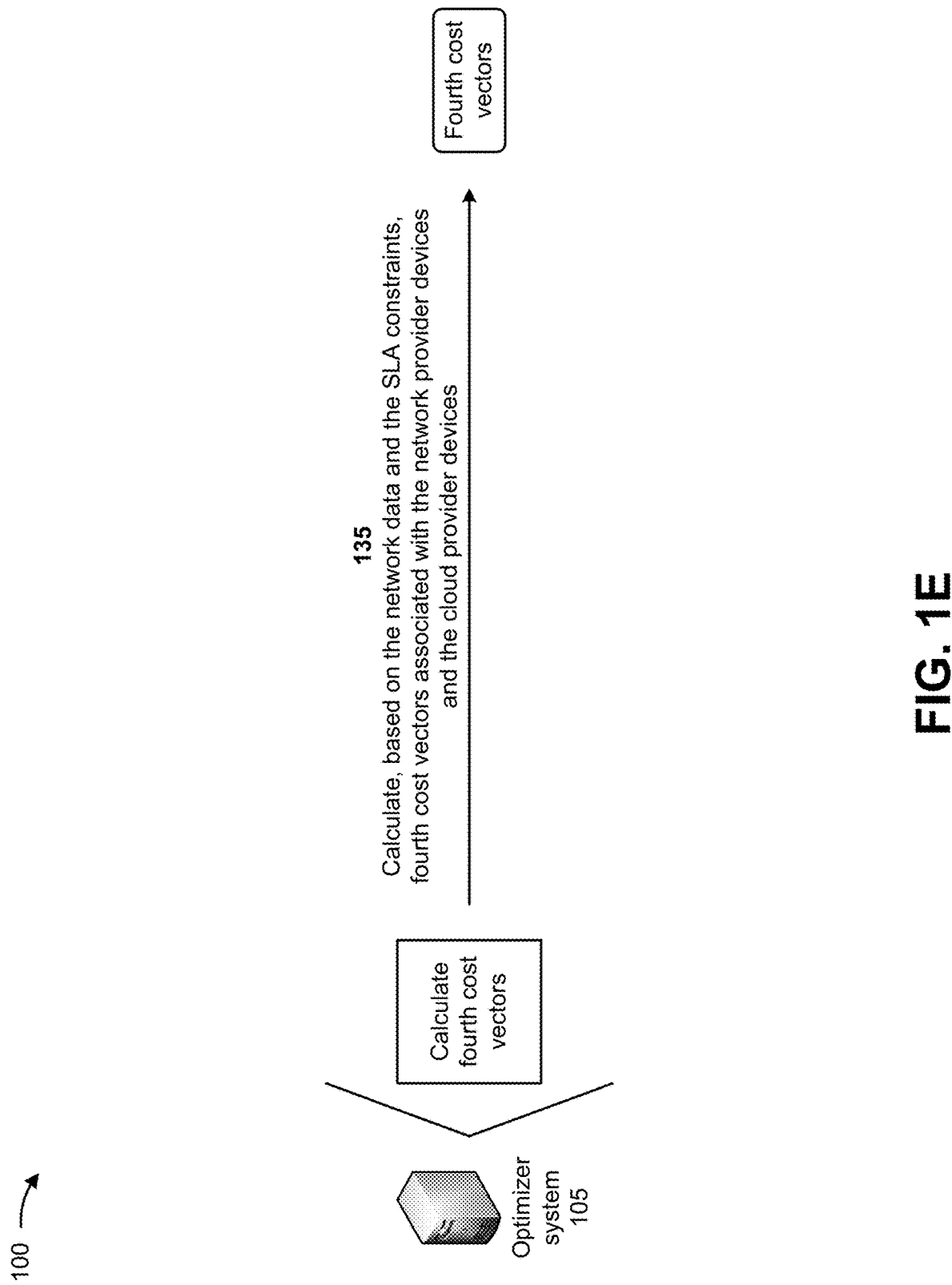

As shown in FIG. 1E, and by reference number 135, the optimizer system 105 may calculate, based on the network data and the SLA constraints, fourth cost vectors associated with the network provider devices and the cloud provider devices. For example, when calculating the fourth cost vectors associated with the network provider devices and the cloud provider devices, the optimizer system 105 may utilize the network data and the SLA constraints to calculate memory utilizations, processor utilizations, and bandwidth utilizations associated with the network provider devices and the cloud provider devices, and to generate the fourth cost vectors based on the memory utilizations, the processor utilizations, and the bandwidth utilizations. In some implementations, costs associated with the network provider devices and the cloud provider devices may be provided by $C_{D-UTIL}$, costs for memory utilizations associated with the network provider devices may be provided by $NPGW_{mem-util}$, costs for processor utilizations associated with the network provider devices may be provided by $NPGW_{cpu-util}$, costs for bandwidth utilizations associated with the network provider devices may be provided by $NPGW_{port-util}$, costs for memory utilizations associated with the cloud provider devices may be provided by $CPPGW_{mem-util}$, costs for processor utilizations associated with the cloud provider devices may be provided by $CPGW_{cpu-util}$, costs for bandwidth utilizations associated with the cloud provider devices may be provided by $CPGW_{port-util}$. In such implementations, the fourth cost vectors may be provided by the following:

$$C_{D-UTIL} = \begin{bmatrix} NPGW_{mem-util} \\ NPGW_{cpu-util} \\ NPGW_{port-util} \\ CPGW_{mem-util} \\ CPGW_{cpu-util} \\ CPGW_{port-util} \end{bmatrix}.$$

Figure 1F:
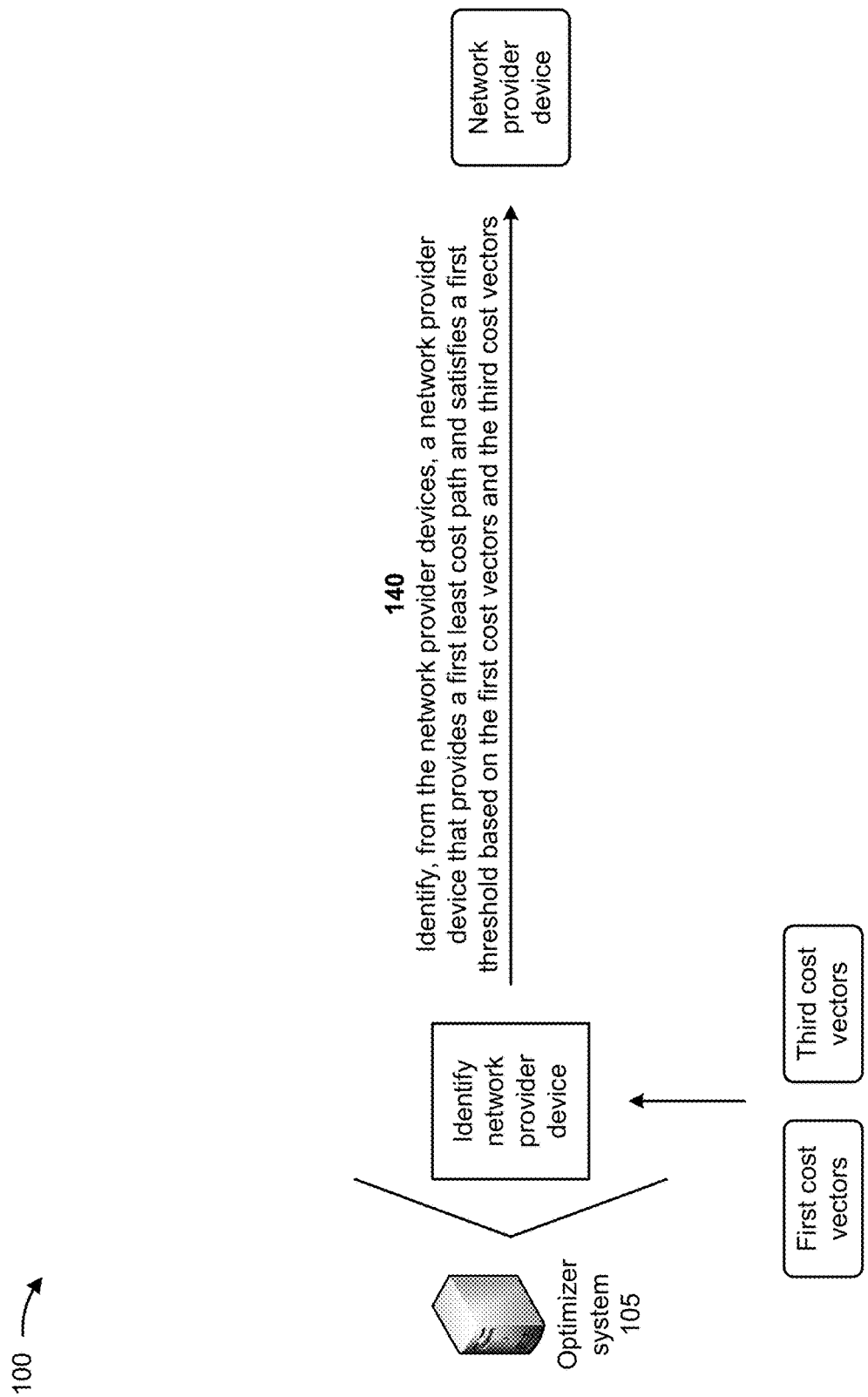

As shown in FIG. 1F, and by reference number 140, the optimizer system 105 may identify, from the network provider devices, a network provider device that provides a first least cost path and satisfies a first threshold based on the first cost vectors and the third cost vectors. For example, a cost of a link between two neighboring network provider devices may be provided as $C_{NPGW-NPGW}$ and a cost of a link between two neighboring cloud provider devices may be provided as $C_{CPGW-CPGW}$. The optimizer system 105 may calculate a cost associated with access of the user device to a network provider device according to Equations 1 and 2:

$$C_{D-REMOTE-NPGW} \leq C_{D-NPGW} + (i-1)*C_{NPGW-NPGW} \quad (1), \text{ and}$$

$$C_{NPGW-REMOTE-CPGW} \leq C_{NPGW-CPGW} + (j-1)*C_{CPGW-CPGW} \quad (2).$$

The optimizer system 105 may ensure that the calculated cost satisfies Equations 3 and 4:

$$C_{D-CPGW} \leq C_{D-NPGW} + C_{NPGW-CPGW} \leq C_{D-SLA} \quad (3), \text{ and}$$

$$C_{D-REMOTE-CPGW} \leq C_{D-NPGW} + (i-1)*C_{NPGW-NPGW} + C_{NPGW-CPGW} + (j-1)*C_{CPGW-NPGW} \leq C_{D-SLA} \quad (4),$$

where $C_{D-SLA}$ may be based on a usage-based charge, a delay, a jitter, and/or a packet loss agreement with a customer (e.g., the user of the user device). Equation 3 provides a cost associated with a device accessing a closest NPGW (e.g., an optimally-located NPGW for the device) in a given NPGW cluster. The optimal NPGW accesses a closest CPGW (e.g., an optimally-located CPGW for the optimal NPGW) in a given CPGW cluster. However Equation 4 provides a cost associated with the device accessing another NPGW, other than the optimally-located NPGW, within the NPGW cluster. The other NPGW accesses another CPGW, other than the optimally-located CPGW within that CPGW cluster.

The optimizer system 105 may utilize Equation 1, the first cost vectors, and the third cost vectors to identify, from the network provider devices, the network provider device that provides the first least cost path and satisfies the first threshold. If none of the network provider devices satisfy Equation 1 for the first cost vectors and the third cost vectors, the optimizer system 105 may select a network provider device from the network provider devices (e.g., that provides a least cost path but fails to satisfy the first threshold). If multiple network provider devices satisfy Equation 1 for the first cost vectors and the third cost vectors, the optimizer system 105 may utilize the multiple network provider devices for the determinations described below in connection with FIG. 1G.

As shown in FIG. 1G, and by reference number 145, the optimizer system 105 may identify, from the cloud provider devices, a set of cloud provider devices that support the application for the network provider device. For example, the optimizer system 105 may identify, from the cloud provider devices, a set of cloud provider devices that support the application for the network provider device (or multiple network provider devices) determined above in connection with FIG. 1F. The optimizer system 105 may repeat the determinations described above in connection with FIG. 1F until the optimizer system 105 identifies a network provider device that supports access to a cloud provider device that has access to the application.

As shown in FIG. 1H, and by reference number 150, the optimizer system 105 may identify, from the set of cloud provider devices, a cloud provider device that provides a second least cost path and satisfies a second threshold based on the second cost vectors and the fourth cost vectors. For example, the optimizer system 105 may identify, from the set of cloud provider devices, the cloud provider device that provides the second least cost path, satisfies the second threshold, and satisfies Equation 2 for the second cost vectors, the fourth cost vectors, the network provider device (or multiple network provider devices) determined above in connection with FIG. 1F. The optimizer system 105 may repeat the determinations described above in connection with FIG. 1G until the optimizer system 105 identifies a network provider device that supports access to the cloud provider device that has access to application. If none of the set of cloud provider devices satisfy Equation 2 for the second cost vectors and the fourth cost vectors, the optimizer system 105 may select a cloud provider from the set of cloud provider devices (e.g., that provides a least cost path but fails to satisfy the second threshold). If there are multiple cloud provider devices satisfy Equation 2 for the second cost vectors and the fourth cost vectors, the optimizer system 105 may randomly select one of the multiple cloud provider devices.

Figure 1I:
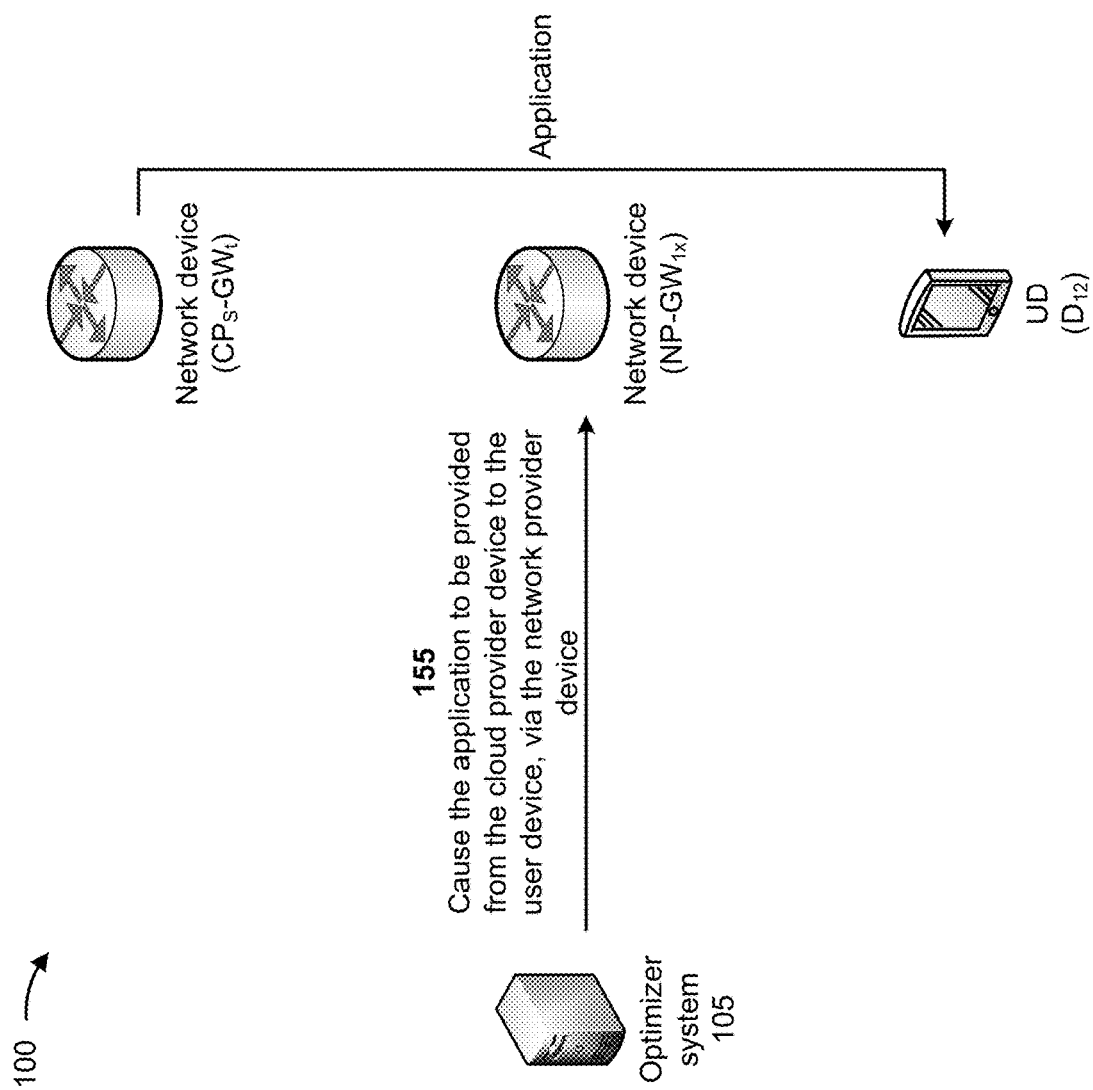

As shown in FIG. 1I, and by reference number 155, the optimizer system 105 may cause the application to be provided from the cloud provider device to the user device, via the network provider device. For example, when causing the application to be provided from the cloud provider device to the user device, via the network provider device, the optimizer system 105 may cause the network provider device and the cloud provider device to define a path (e.g., that includes the first least cost path and the second least cost path) for the user device to access the application from the cloud provider device. The optimizer system 105 may then cause the application to be provided from the cloud provider device to the user device, via the path. In some implementations, the path for the user device to access the application from the cloud provider device may satisfy the SLA constraints. For example, as further shown in FIG. 1I, the optimizer system 105 may identify a particular cloud provider device (e.g., network device $CPs\text{-}GW_t$) and a particular network provider device (e.g., network device $NP\text{-}GW_{1x}$), and may cause the application to be provided from the particular cloud provider device to the user device (e.g., $D_{12}$), via the particular network provider device.

In this way, the optimizer system 105 calculates optimum customer access paths for applications provided by multi-cloud providers through private networks. For example, the optimizer system 105 may identify, for a user device (e.g., a customer device) attempting to access an application, an optimum network provider device (e.g., gateway) that provides a least cost access path (e.g., that provides minimum delay, jitter, loss, and/or the like) and resource (e.g., processor, memory, bandwidth, and/or the like) utilizations below a threshold level. The optimization system 105 may identify cloud provider devices (e.g., gateways) that support the application, and may identify, for the optimum network provider device and from the cloud provider devices that support the application, an optimum cloud provider device that provides a least cost access path (e.g., minimum usage charge, delay, jitter, loss, and/or the like) and resource utilizations below a threshold level. Thus, the optimizer system 105 may conserve computing resources, networking resources, and/or other resources that would have otherwise been consumed by handling poor customer experiences associated with accessing the applications, inefficiently utilizing network provider devices, inefficiently utilize cloud provider devices, handling lost traffic associated with accessing the applications, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
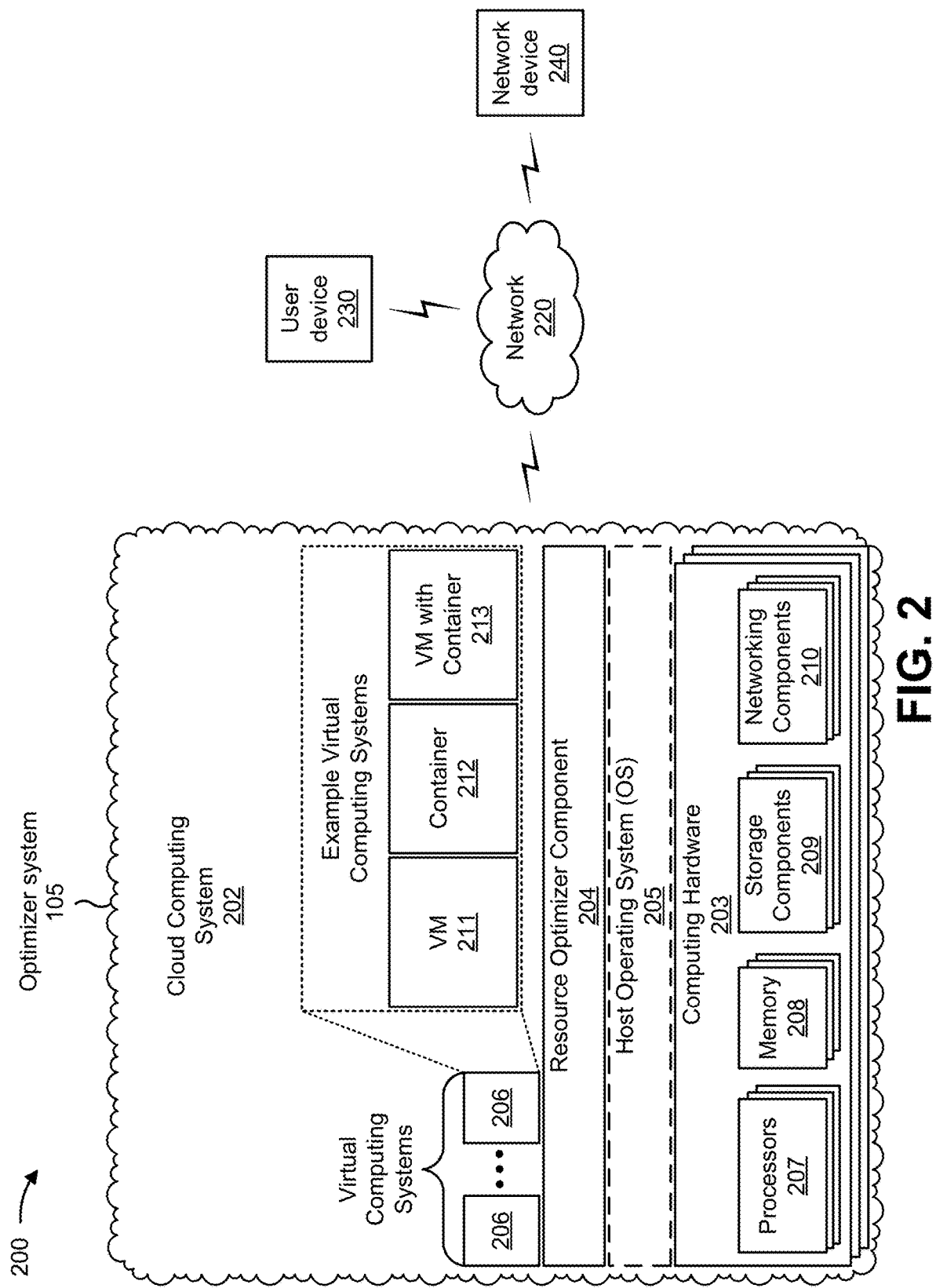
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the optimizer system 105, which may include one or more elements of and/or may execute within a cloud computing system 202. The cloud computing system 202 may include one or more elements 203-213, as described in more detail below. As further shown in FIG. 2, the environment 200 may include a network 220, a user device 230, and/or a network device 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the optimizer system 105 may include one or more elements 203-213 of the cloud computing system 202, may execute within the cloud computing system 202, and/or may be hosted within the cloud computing system 202, in some implementations, the optimizer system 105 may not be cloud-based (e.g., may be implemented outside of a cloud computing system) or may be partially cloud-based. For example, the optimizer system 105 may include one or more devices that are not part of the cloud computing system 202, such as a device 300 of FIG. 3, which may include a standalone server or another type of computing device. The optimizer system 105 may perform one or more operations and/or processes described in more detail elsewhere herein.

The network 220 includes one or more wired and/or wireless networks and/or satellite networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 includes one or more devices capable of receiving, generating, storing, processing, and/or providing information, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network device 240 includes one or more devices capable of receiving, processing, storing, routing, and/or providing traffic (e.g., a packet and/or other information or metadata) in a manner described herein. For example, the network device 240 may include a router, such as a label switching router (LSR), a label edge router (LER), an ingress router, an egress router, a provider router (e.g., a provider edge router or a provider core router), a virtual router, or another type of router. Additionally, or alternatively, the network device 240 may include a gateway, a switch, a firewall, a hub, a bridge, a reverse proxy, a server (e.g., a proxy server, a cloud server, or a data center server), a load balancer, and/or a similar device. In some implementations, the network device 240 may be a physical device implemented within a housing, such as a chassis. In some implementations, the network device 240 may be a virtual device implemented by one or more computing devices of a cloud computing environment or a data center. In some implementations, a group of network devices 240 may be a group of data center nodes that are used to route traffic flow through a network. In some implementations, the network device 240 may include a base station, such as an aggregated base station, a disaggregated base station, an integrated access and backhaul (IAB) node, a relay node, and/or one or more components thereof. The base station may refer to a central unit (CU), a distributed unit (DU), a radio unit (RU), a Near-Real Time (Near-RT) RAN Intelligent Controller (RIC), or a Non-Real Time (Non-RT) RIC, or a combination thereof.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
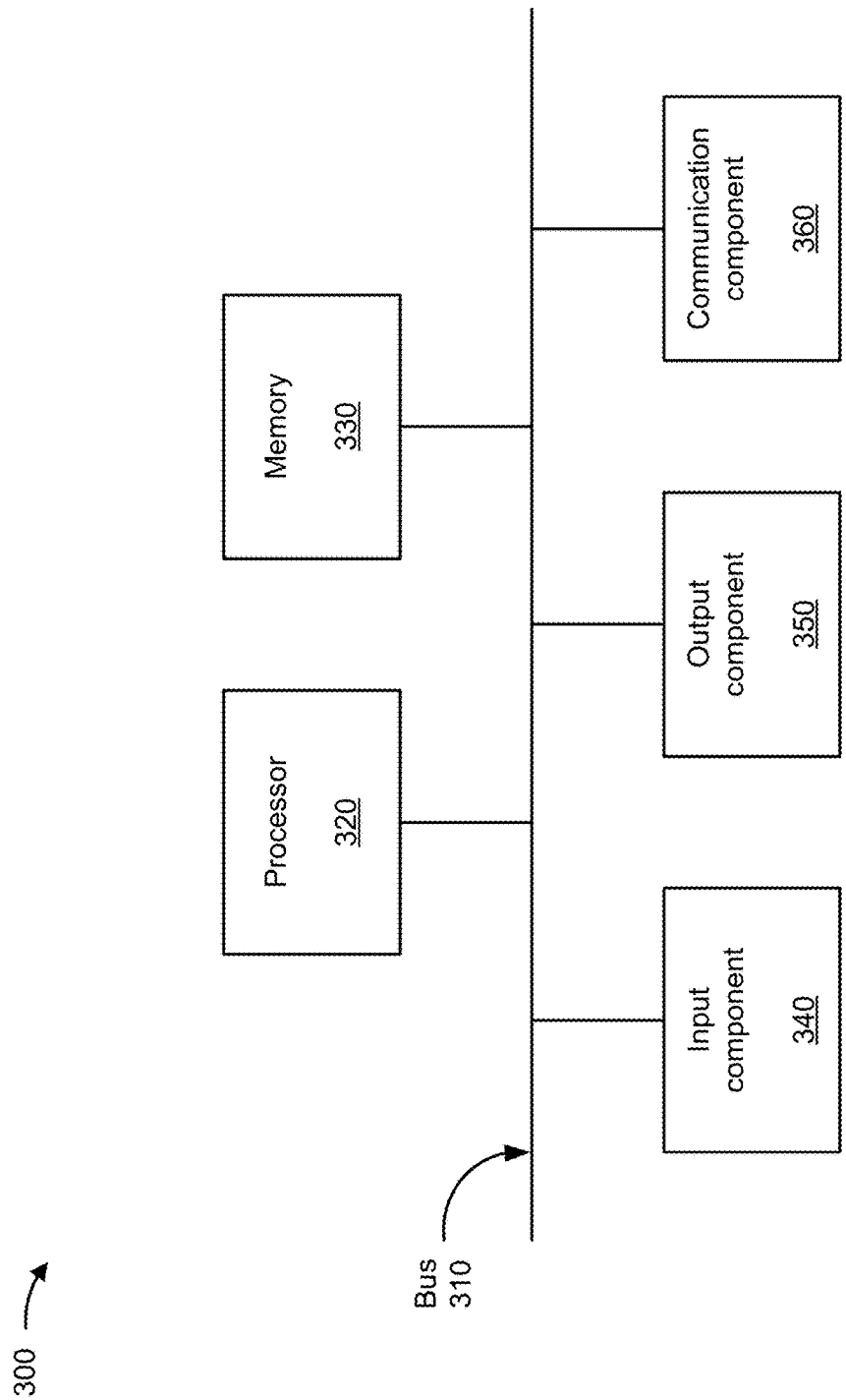
FIG. 3 is a diagram of example components of one or more devices of FIG. 2.

FIG. 3 is a diagram of example components of a device 300, which may correspond to the optimizer system 105, the user device 230, and/or the network device 240. In some implementations, the optimizer system 105, the user device 230, and/or the network device 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
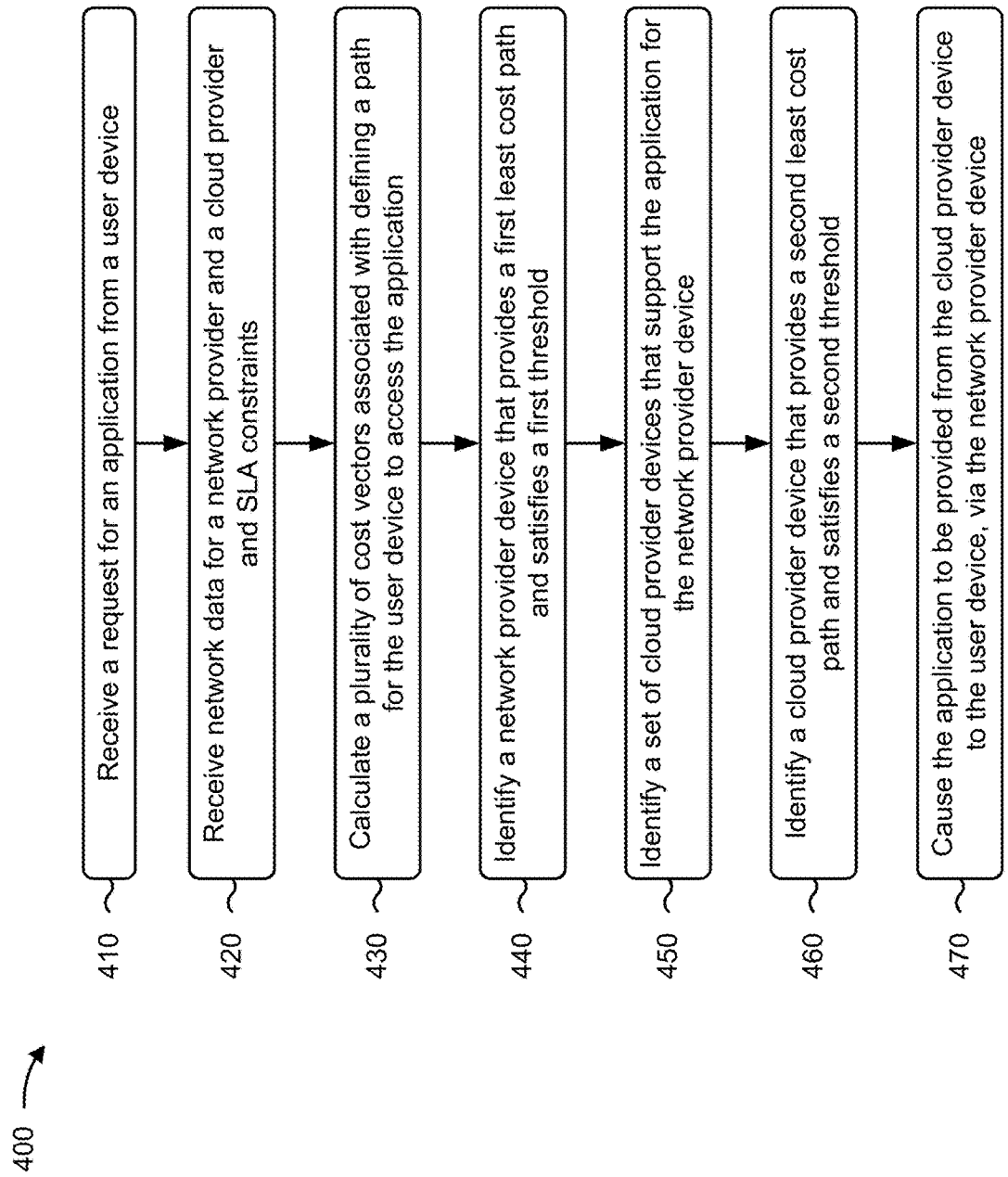
FIG. 4 is a flowchart of an example process for calculating optimum customer access paths for applications provided by multi-cloud providers through private networks.

FIG. 4 depicts a flowchart of an example process 400 for calculating optimum customer access paths for applications provided by multi-cloud providers through private networks.

In some implementations, one or more process blocks of FIG. 4 may be performed by a device (e.g., the optimizer system 105). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a request for an application from a user device (block 410). For example, the device may receive a request for an application from a user device, as described above.

As further shown in FIG. 4, process 400 may include receiving network data for a network provider and a cloud provider and SLA constraints (block 420). For example, the device may receive network data for a network provider and a cloud provider associated with the user device, and service level agreement (SLA) constraints associated with the user device, the network provider, and the cloud provider, as described above. In some implementations, the network data includes data identifying one or more of delays associated with access of the user device to the plurality of network provider devices, losses associated with access of the user device to the plurality of network provider devices, jitter associating with access of the user device to the plurality of network provider devices, memory utilizations associated with the plurality of network provider devices and the plurality of cloud provider devices, utilizations associated with the plurality of network provider devices and the plurality of cloud provider devices, utilizations associated with the plurality of network provider devices and the plurality of cloud provider devices, delays associated with access of the plurality of network provider devices to the plurality of cloud provider devices, losses associated with access of the plurality of network provider devices to the plurality of cloud provider devices, jitter associating with access of the plurality of network provider devices to the plurality of cloud provider devices, and usage charges associated with access of the plurality of network provider devices to the plurality of cloud provider devices.

In some implementations, the SLA constraints include constraints associated with one or more of usage charges, round trip/one-way delays for access of the user device to the plurality of cloud provider devices, one-way losses for access of the user device to the plurality of cloud provider devices, one-way jitter for access of the user device to the plurality of cloud provider devices, memory utilizations for the plurality of network provider devices and the plurality of cloud provider devices, utilizations for the plurality of network provider devices and the plurality of cloud provider devices, or utilizations for the plurality of network provider devices and the plurality of cloud provider devices. In some implementations, the network provider provides a private network that includes the plurality of network provider devices.

As further shown in FIG. 4, process 400 may include calculating a plurality of cost vectors associated with defining a path for the user device to access the application (block 430). For example, the device may calculate, based on the network data and the SLA constraints, a plurality of cost vectors associated with defining a path for the user device to access the application, as described above. In some implementations, calculating, based on the network data and the SLA constraints, the plurality of cost vectors associated with defining the path for the user device to access the application includes calculating first cost vectors associated with access of the user device to the plurality of network provider devices, calculating second cost vectors associated with access of the plurality of network provider devices to the plurality of cloud provider devices, calculating third cost vectors associated with SLA constraints of the user device, and calculating fourth cost vectors associated with the plurality of network provider devices and the plurality of cloud provider devices.

In some implementations, calculating the first cost vectors associated with access of the user device to the plurality of network provider devices includes calculating delays, losses, and jitter associated with access of the user device to the plurality of network provider devices, and generating the first cost vectors based on the delays, the losses, and the jitter. In some implementations, calculating the second cost vectors associated with access of the plurality of network provider devices to the plurality of cloud provider devices includes calculating delays, losses, jitter, and usage charges associated with access of the plurality of network provider devices to the plurality of cloud provider devices, and generating the second cost vectors based on the delays, the losses, the jitter, and the usage charges. In some implementations, calculating the third cost vectors associated with the SLA constraints of the user device includes calculating delays, losses, jitter, and usage charges associated with the SLA constraints of the user device, and generating the third cost vectors based on the delays, the losses, the jitter, and the usage charges. In some implementations, calculating the fourth cost vectors associated with the plurality of network provider devices and the plurality of cloud provider devices includes calculating memory utilizations, processor utilizations, and bandwidth utilizations associated with the plurality of network provider devices and the plurality of cloud provider devices, and generating the fourth cost vectors based on the memory utilizations, the processor utilizations, and the bandwidth utilizations.

As further shown in FIG. 4, process 400 may include identifying a network provider device that provides a first least cost path and satisfies a first threshold (block 440). For example, the device may identify, from a plurality of network provider devices, a network provider device that provides a first least cost path and satisfies a first threshold based on the plurality of cost vectors, as described above.

As further shown in FIG. 4, process 400 may include identifying a set of cloud provider devices that support the application for the network provider device (block 450). For example, the device may identify, from a plurality of cloud provider devices, a set of cloud provider devices that support the application for the network provider device, as described above. In some implementations, the plurality of network provider devices are gateways associated with the network provider, and the plurality of cloud provider devices are gateways associated with the cloud provider.

As further shown in FIG. 4, process 400 may include identifying a cloud provider device that provides a second least cost path and satisfies a second threshold (block 460). For example, the device may identify, from the set of cloud provider devices, a cloud provider device that provides a second least cost path and satisfies a second threshold based on the plurality of cost vectors, as described above. In some implementations, identifying the cloud provider device that provides the second least cost path and satisfies the second threshold includes randomly selecting the cloud provider device from the set of cloud provider devices.

As further shown in FIG. 4, process 400 may include causing the application to be provided from the cloud provider device to the user device, via the network provider device (block 470). For example, the device may cause the application to be provided from the cloud provider device to the user device, via the network provider device, as described above. In some implementations, causing the application to be provided from the cloud provider device to the user device, via the network provider device includes causing the network provider device and the cloud provider device to define the path for the user device to access the application from the cloud provider device, and causing the application to be provided from the cloud provider device to the user device, via the path. In some implementations, the path for the user device to access the application from the cloud provider device satisfies the SLA constraints.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
 receiving, by a device, a request for an application from a user device;
 receiving, by the device, network data for a network provider and a cloud provider associated with the user device, and service level agreement (SLA) constraints associated with the user device, the network provider, and the cloud provider;
 calculating, by the device and based on the network data and the SLA constraints, a plurality of cost vectors associated with defining a path for the user device to access the application,
 wherein the plurality of cost vectors include:
  first cost vectors associated with access of the user device to a plurality of network provider devices of a network provider network,
  second cost vectors associated with access of the plurality of network provider devices to a plurality of cloud provider devices of one or more cloud provider clusters,
  third cost vectors associated with the SLA constraints, and
  fourth cost vectors associated with the plurality of network provider devices and the plurality of cloud provider devices;
 identifying, by the device and from the plurality of network provider devices, a network provider device that provides a first least cost path and satisfies a first threshold based on the first cost vectors and the third cost vectors;
 identifying, by the device and from the plurality of cloud provider devices, a set of cloud provider devices that support the application for the network provider device;
 identifying, by the device and from the set of cloud provider devices, a cloud provider device that provides a second least cost path and satisfies a second threshold based on the second cost vectors and the fourth cost vectors; and causing, by the device, the application to be provided from the cloud provider device to the user device, via the network provider device.

2. The method of claim 1, wherein calculating the plurality of cost vectors comprises:
calculating delays, losses, and jitter associated with access of the user device to the plurality of network provider devices; and
generating the first cost vectors based on the delays, the losses, and the jitter.

3. The method of claim 1, wherein calculating the plurality of cost vectors comprises:
calculating delays, losses, jitter, and usage charges associated with access of the plurality of network provider devices to the plurality of cloud provider devices; and
generating the second cost vectors based on the delays, the losses, the jitter, and the usage charges.

4. The method of claim 1, wherein calculating the plurality of cost vectors comprises:
calculating delays, losses, jitter, and usage charges associated with the SLA constraints of the user device; and
generating the third cost vectors based on the delays, the losses, the jitter, and the usage charges.

5. The method of claim 1, wherein calculating the plurality of cost vectors comprises:
calculating memory utilizations, processor utilizations, and bandwidth utilizations associated with the plurality of network provider devices and the plurality of cloud provider devices; and
generating the fourth cost vectors based on the memory utilizations, the processor utilizations, and the bandwidth utilizations.

6. The method of claim 1, wherein the network data includes data identifying one or more of:
delays associated with access of the user device to the plurality of network provider devices,
losses associated with access of the user device to the plurality of network provider devices,
jitter associated with access of the user device to the plurality of network provider devices,
memory utilizations associated with the plurality of network provider devices and the plurality of cloud provider devices,
processor utilizations associated with the plurality of network provider devices and the plurality of cloud provider devices,
bandwidth utilizations associated with the plurality of network provider devices and the plurality of cloud provider devices,
delays associated with access of the plurality of network provider devices to the plurality of cloud provider devices,
losses associated with access of the plurality of network provider devices to the plurality of cloud provider devices,
jitter associated with access of the plurality of network provider devices to the plurality of cloud provider devices, or
usage charges associated with access of the plurality of network provider devices to the plurality of cloud provider devices.

7. The method of claim 1, wherein the plurality of network provider devices are gateways associated with the network provider, and wherein the plurality of cloud provider devices are gateways associated with the cloud provider.

8. A device, comprising:
one or more processors configured to:
receive a request for an application from a user device;
receive network data for a network provider and a cloud provider associated with the user device, and service level agreement (SLA) constraints associated with the user device, the network provider, and the cloud provider,
wherein the network data includes data identifying one or more of:
delays, losses, and jitter associated with access of the user device to a plurality of network provider devices of a network provider network,
memory utilizations, processor utilizations, and bandwidth utilizations associated with the plurality of network provider devices and a plurality of cloud provider devices of one or more cloud provider clusters, or
delays, losses, jitter, and usage charges associated with access of the plurality of network provider devices to the plurality of cloud provider devices;
calculate, based on the network data and the SLA constraints, a plurality of cost vectors associated with defining a path for the user device to access the application,
wherein the plurality of cost vectors include:
first cost vectors associated with access of the user device to the plurality of network provider devices,
second cost vectors associated with access of the plurality of network provider devices to the plurality of cloud provider devices,
third cost vectors associated with the SLA constraints, and
fourth cost vectors associated with the plurality of network provider devices and the plurality of cloud provider devices;
identify, from the plurality of network provider devices, a network provider device that provides a first least cost path and satisfies a first threshold based on the first cost vectors and the third cost vectors;
identify, from the plurality of cloud provider devices, a set of cloud provider devices that support the application for the network provider device;
identify, from the set of cloud provider devices, a cloud provider device that provides a second least cost path and satisfies a second threshold based on the second cost vectors and the fourth cost vectors; and
cause the application to be provided from the cloud provider device to the user device, via the network provider device.

9. The device of claim 8, wherein the SLA constraints include constraints associated with one or more of:
usage charges,
round trip delays or one-way delays for access of the user device to the plurality of cloud provider devices,
one-way losses for access of the user device to the plurality of cloud provider devices,
one-way jitter for access of the user device to the plurality of cloud provider devices,
memory utilizations for the plurality of network provider devices and the plurality of cloud provider devices,
processor utilizations for the plurality of network provider devices and the plurality of cloud provider devices, or bandwidth utilizations for the plurality of network provider devices and the plurality of cloud provider devices.

10. The device of claim 8, wherein the one or more processors, to identify the cloud provider device that provides the second least cost path and satisfies the second threshold, are configured to:
   randomly select the cloud provider device from the set of cloud provider devices.

11. The device of claim 8, wherein the one or more processors, to cause the application to be provided from the cloud provider device to the user device, via the network provider device, are configured to:
   cause the network provider device and the cloud provider device to define the path for the user device to access the application from the cloud provider device; and
   cause the application to be provided from the cloud provider device to the user device, via the path.

12. The device of claim 8, wherein the network provider provides the network provider network that includes the plurality of network provider devices, and
   wherein the network provider network is a private network.

13. The device of claim 8, wherein the plurality of network provider devices are gateways associated with the network provider, and
   wherein the plurality of cloud provider devices are gateways associated with the cloud provider.

14. The device of claim 8, wherein the path for the user device to access the application from the cloud provider device satisfies the SLA constraints.

15. A non-transitory computer-readable medium storing a set of instructions, the set of instructions comprising:
   one or more instructions that, when executed by one or more processors of a device, cause the device to:
      receive a request for an application from a user device;
      receive network data for a network provider and a cloud provider associated with the user device, and service level agreement (SLA) constraints associated with the user device, the network provider, and the cloud provider;
      calculate, based on the network data and the SLA constraints, a plurality of cost vectors associated with defining a path for the user device to access the application,
         wherein the plurality of cost vectors include:
            first cost vectors associated with access of the user device to a plurality of network provider devices of a network provider network,
            second cost vectors associated with access of the plurality of network provider devices to a plurality of cloud provider devices of one or more cloud provider clusters,
            third cost vectors associated with the SLA constraints, and
            fourth cost vectors associated with the plurality of network provider devices and the plurality of cloud provider devices;
      identify, from the plurality of network provider devices, a network provider device that provides a first least cost path and satisfies a first threshold based on the first cost vectors and the third cost vectors;
      identify, from the plurality of cloud provider devices, a set of cloud provider devices that support the application for the network provider device;
      identify, from the set of cloud provider devices, a cloud provider device that provides a second least cost path and satisfies a second threshold based on the second cost vectors and the fourth cost vectors;
      cause the network provider device and the cloud provider device to define the path for the user device to access the application from the cloud provider device; and
      cause the application to be provided from the cloud provider device to the user device, via the path.

16. The non-transitory computer-readable medium of claim 15, wherein the one or more instructions, that cause the device to calculate the plurality of cost vectors, cause the device to:
   calculate delays, losses, and jitter associated with access of the user device to the plurality of network provider devices;
   generate the first cost vectors based on the delays, the losses, and the jitter;
   calculate delays, losses, jitter, and usage charges associated with access of the plurality of network provider devices to the plurality of cloud provider devices; and
   generate the second cost vectors based on the delays, the losses, the jitter, and the usage charges.

17. The non-transitory computer-readable medium of claim 15, wherein the one or more instructions, that cause the device to calculate the plurality of cost vectors, cause the device to:
   calculate delays, losses, jitter, and usage charges associated with the SLA constraints of the user device;
   generate the third cost vectors based on the delays, the losses, the jitter, and the usage charges;
   calculate memory utilizations, processor utilizations, and bandwidth utilizations associated with the plurality of network provider devices and the plurality of cloud provider devices; and
   generate the fourth cost vectors based on the memory utilizations, the processor utilizations, and the bandwidth utilizations.

18. The non-transitory computer-readable medium of claim 15, wherein the one or more instructions, that cause the device to identify the cloud provider device that provides the second least cost path and satisfies the second threshold, cause the device to:
   randomly select the cloud provider device from the set of cloud provider devices.

19. The non-transitory computer-readable medium of claim 15, wherein the path for the user device to access the application from the cloud provider device satisfies the SLA constraints.

20. The non-transitory computer-readable medium of claim 15, wherein the plurality of network provider devices are gateways associated with the network provider, and
   wherein the plurality of cloud provider devices are gateways associated with the cloud provider.

* * * * *